United States Patent
Okino

(10) Patent No.: US 8,462,869 B2
(45) Date of Patent: Jun. 11, 2013

(54) CHANNEL INFORMATION PREDICTION SYSTEM AND CHANNEL INFORMATION PREDICTION METHOD

(75) Inventor: Kenta Okino, Yokohama (JP)

(73) Assignee: Kyocera Corporation, Kyoto (JP)

( * ) Notice: Subject to any disclaimer, the term of this patent is extended or adjusted under 35 U.S.C. 154(b) by 386 days.

(21) Appl. No.: 12/920,087

(22) PCT Filed: Feb. 26, 2009

(86) PCT No.: PCT/JP2009/053577
§ 371 (c)(1),
(2), (4) Date: Dec. 1, 2010

(87) PCT Pub. No.: WO2009/107732
PCT Pub. Date: Sep. 3, 2009

(65) Prior Publication Data
US 2011/0090980 A1   Apr. 21, 2011

(30) Foreign Application Priority Data
Feb. 27, 2008   (JP) .................................. 2008-046928

(51) Int. Cl.
*H04L 1/02*   (2006.01)
*H04B 7/02*   (2006.01)

(52) U.S. Cl.
USPC .......................................................... 375/267

(58) Field of Classification Search
USPC .................. 375/259, 260, 267, 295, 316, 346
See application file for complete search history.

(56) References Cited

U.S. PATENT DOCUMENTS

2009/0129501 A1 *   5/2009   Mehta et al. .................. 375/299
2009/0262869 A1 *  10/2009   Beaulieu et al. .............. 375/340

* cited by examiner

*Primary Examiner* — Kevin M Burd
(74) *Attorney, Agent, or Firm* — Duane Morris LLP

(57) ABSTRACT

Provided is a channel information prediction system which uses a low ray element in a transformation MIMO CSI to calculate a first prediction filter coefficient. By using the obtained first prediction filter coefficient, the system executes a first prediction for predicting channel information upon a radio signal transmission in the future and suppresses a component of the ray contained in the low ray element. By using the low ray component in which the ray component is suppressed, the system executes a second prediction for predicting channel information upon a radio signal transmission in the future.

7 Claims, 7 Drawing Sheets

FIG. 4A

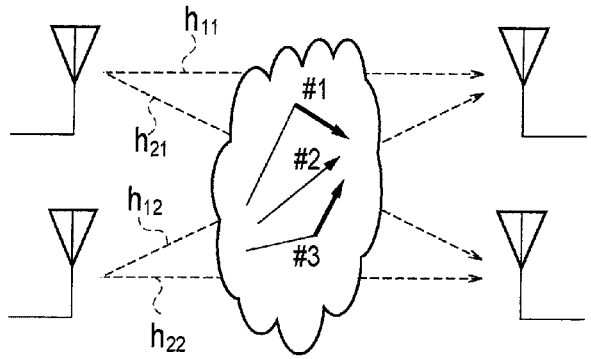

FIG. 4B

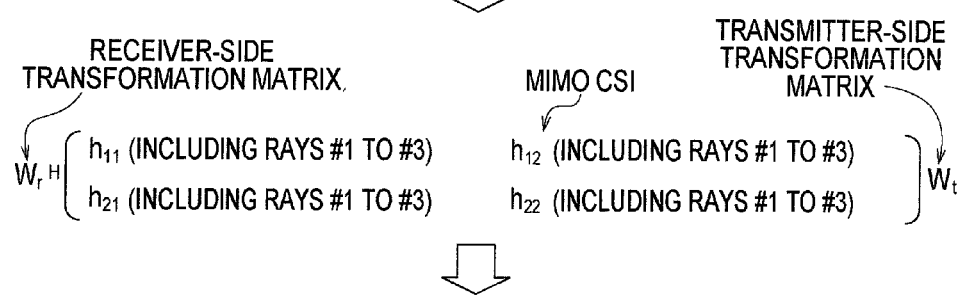

FIG. 4C $\begin{pmatrix} y_{11} \text{ (INCLUDING RAYS \#1 TO \#3)} & y_{12} \text{ (INCLUDING RAYS \#1 AND \#2)} \\ y_{21} \text{ (INCLUDING RAYS \#1 AND \#3)} & y_{22} \text{ (INCLUDING RAY \#1)} \end{pmatrix}$

TRANSFORMATION MIMO CSI

LOW RAY ELEMENT
(1) CALCULATION OF PREDICTION FILTER COEFFICIENT
(2) CHANNEL PREDICTION

FIG. 4D (1) CHANNEL PREDICTION USING PREDICTION FILTER OF $y_{22}$ (A)
(2) SUPPRESSION OF RAY #1 (REMOVAL)
(3) CALCULATION OF PREDICTION FILTER COEFFICIENT
(4) CHANNEL PREDICTION (B)

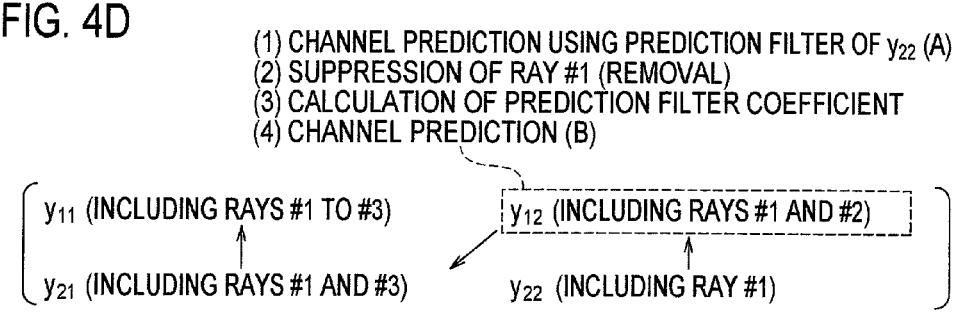

CHANNEL INFORMATION PREDICTION SYSTEM AND CHANNEL INFORMATION PREDICTION METHOD

CROSS-REFERENCE TO RELATED APPLICATIONS

This is a U.S. National Phase Application of International Application No. PCT/JP2009/053577 filed Feb. 26, 2009, which claims priority to Japanese Patent Application No. 2008-046928 filed Feb. 27, 2008, the disclosures of which are incorporated herein by reference in their entirety.

TECHNICAL FIELD

The present invention relates to a channel information prediction system and a channel information prediction method of calculating a prediction filter coefficient to be used to suppress an interference component contained in a received radio signal in a multi-antenna transmission system.

BACKGROUND ART

In recent years, there has been achieved a multi-antenna transmission system in which a transmitter and a receiver use multiple antennas for transmitting and receiving radio signals in order to improve utilization efficiency of radio frequencies. In the multi-antenna transmission, system, Multi-Input Multi-Output (MIMO) technique is generally introduced.

In such a multi-antenna transmission system, channel information (hereinafter, abbreviated as MIMO CSI as needed) indicating a transmission path characteristic on a receiver side in a MIMO environment can be estimated on a transmitter side using the reversibility of a propagation path in time division duplexing, or by using a feedback channel also in frequency division duplexing (FDD). Accordingly, there has been known a method of predicting MIMO CSI in the future, i.e., at the time of transmitting the next radio signal by using the past and current MIMO CSI (see, non-patent literature 1 and non-patent literature 2).

In addition, the channel information prediction uses a method of suppressing an interference component of a received radio signal by using a prediction filter coefficient calculated according to the Minimum Mean Square Error (MMSE) criterion.

Non-patent literature 1: T. Eyceoz, S. Hu, and A. Duel-Hallen, "Performance Analysis of Long Range Prediction for Fast Fading Channels," Proc. of 33rd Annual Conf. on Inform. Sciences and Systems CISS'99, Vol. II, pp. 656-661, March 1999.

Non-patent literature 2: T. Svantesson, A. L. Swindlehurst, "A Performance Bound for Prediction of MIMO Channels", IEEE Trans. Signal Process., vol. 54, no. 2, pp. 520-529, February 2006.

DISCLOSURE OF THE INVENTION

However, the above-described conventional MIMO CSI prediction method has the following problems. To be more precise, when interference components, specifically, many rays (reflected waves present on a propagation path), are included in the received radio signal, there occurs a problem that the prediction performance of the MIMO CSI is not sufficiently improved.

Accordingly, the present invention has been made in view of the above circumstances, and an objective of the present invention is to provide a channel information prediction system and a channel information prediction method: which are employed in a multi-antenna transmission system where a prediction filter coefficient to be used for suppressing an interference component contained in the received radio signal is calculated to predict channel information; and which achieve a further improved prediction performance of the channel information.

The present invention has the following characteristics to solve the problems described above. First of all, a first characteristic of the present invention is summarized as a channel information prediction system (channel information prediction system 10) configured to calculate a prediction filter coefficient to be used for suppressing an interference component contained in a received radio signal in a multi-antenna transmission system (multi-antenna transmission system 1) where at least any one of a transmission side (transmitter 100) and a reception side (receiver 200) of a radio signal uses a plurality of antennas (transmission antennas #1 to #T, or reception antennas #1 to #R), the channel information prediction system comprising: a filter coefficient calculator (prediction filter coefficient calculator 95) configured to calculate the prediction filter coefficient using a low ray element being an antenna-to-antenna element whose number of rays contained in the radio signal is smaller than a predetermined number among a plurality of antenna-to-antenna elements each between any of transmission antennas on the transmission side and any of reception antennas on the reception side, the antenna-to-antenna elements distinguished by channel information indicating a propagation path characteristic; and a channel information prediction unit (linear prediction unit 96) configured to perform a first prediction to predict the channel information at a time of future transmission of the radio signal by using the first prediction filter coefficient calculated by the filter coefficient calculator, and to suppress the component of rays contained in the low ray element, wherein the filter coefficient calculator calculates the second prediction filter coefficient by using the low ray component whose component of rays is suppressed by the channel information prediction unit, and the channel information prediction unit performs a second prediction to predict the channel information at a time of future transmission of the radio signal by using the second prediction filter coefficient.

Such a channel information prediction system performs prediction using a first prediction filter coefficient for a low ray element to suppress the component of rays contained in the low ray element. Then, after the component of rays contained in the low ray element is suppressed, a second prediction filter coefficient is calculated and prediction is performed by using a second prediction filter coefficient. As a result, the effects of the ray are suppressed and the prediction performance of the channel information can be improved.

A second characteristic of the present invention is according to the first characteristic of the present invention and is summarized in that the channel information prediction unit uses the second prediction filter coefficient as the first prediction filter coefficient to perform next first prediction and suppress the component of rays.

A third characteristic of the present invention is according to the first or second characteristic of the present invention and is summarized in that the filter coefficient calculator uses the antenna-to-antenna element whose number of rays is the smallest as the low ray element.

A fourth characteristic of the present invention is according to the first or second characteristic of the present invention and is summarized in that the channel information prediction unit suppresses the component of rays contained in another antenna-to-antenna element different from the low ray element on the basis of the prediction filter coefficient, and predicts the channel information at a time of future transmission of the radio signal by using the antenna-to-antenna element whose component of rays is suppressed.

A fifth characteristic of the present invention is summarized as a channel information prediction method of calculating a prediction filter coefficient to be used to suppress an interference component contained in a received radio signal in a multi-antenna transmission system where at least any one of a transmission side and a reception side of a radio signal uses a plurality of antennas, the channel information prediction method comprising the steps of: calculating the prediction filter coefficient using a low ray element being an antenna-to-antenna element whose number of rays contained in the radio signal is smaller than a predetermined number among a plurality of antenna-to-antenna elements each between any of transmission antennas on the transmission side and any of reception antennas on the reception side, the antenna-to-antenna elements distinguished by channel information indicating a propagation path characteristic; performing a first prediction to predict the channel information at a time of future transmission of the radio signal by using the calculated first prediction filter coefficient, and suppressing the component of rays contained in the low ray element; calculating the second prediction filter coefficient by using a low ray component in which the component of rays is suppressed; and performing a second prediction to predict the channel information at a time of future transmission of the radio signal by using the second prediction filter coefficient.

An characteristic of the present invention can provide a channel information prediction system and a channel information prediction method: which are employed in a multi-antenna transmission system where a prediction filter coefficient to be used for suppressing an interference component contained in a received radio signal is calculated to predict channel information; and which achieve a further improved prediction performance of the channel information.

BRIEF DESCRIPTION OF THE DRAWINGS

FIG. 4 is a conceptual diagram for explaining the function of the channel prediction unit according to the embodiment of the present invention.

BEST MODES FOR CARRYING OUT THE INVENTION

Figure 1:
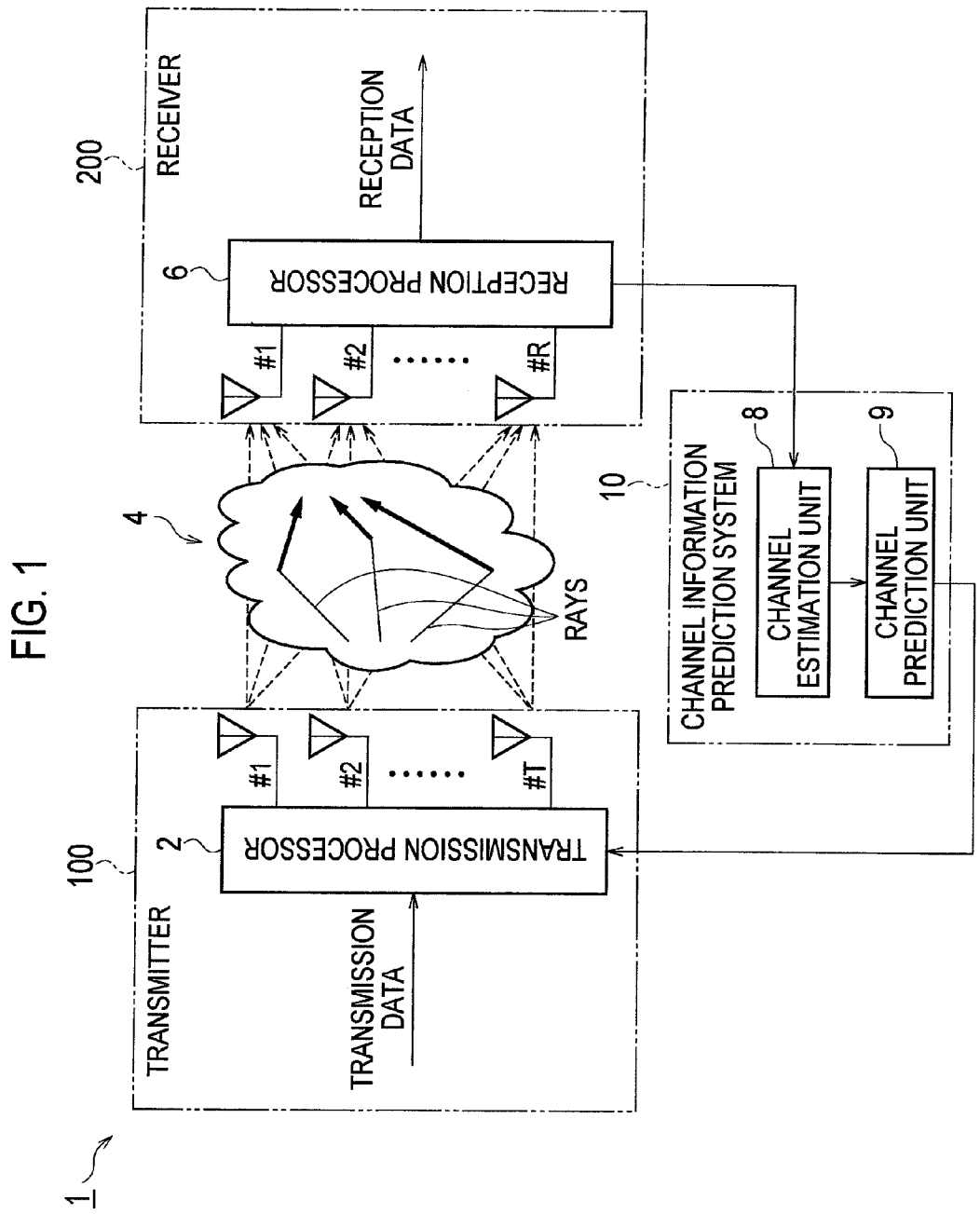
FIG. 1 is an overall view of a schematic configuration of a multi-antenna transmission system according to an embodiment of the present invention.

Next, an embodiment of the present invention is described. Specifically, the description is given of (1) Overall Schematic Configuration, (2) Channel Model, (3) Outline of Beamspace Linear Prediction Processing, (4) Configuration of Channel Prediction Unit, (5) Details of Beamspace Linear Prediction Processing, (6) Operation of Multi-Antenna Transmission System, (7) Effects, and (8) Other Embodiments.

In the following description of the drawings, same or similar reference numerals are given to denote same or similar portions. Note that the drawings are merely schematically shown and proportions of sizes and the like are different from actual ones.

(1) Overall Schematic Configuration

FIG. 1 is an overall view of a schematic configuration of a multi-antenna transmission system 1 according to the present embodiment. As shown in FIG. 1, the multi-antenna transmission system 1 includes a transmitter 100, a receiver 200, and a channel information prediction system 10.

In an example of FIG. 1, the channel information prediction system 10 is provided separately from the transmitter 100 and the receiver 200. However, the channel information prediction system 10 may be provided to any one of the transmitter 100 and the receiver 200 or dispersed in the transmitter 100 and the receiver 200. The channel information prediction system 10 calculates a prediction value of MIMO CSI in the future (hereinafter abbreviated as a MIMO CSI prediction value as needed) by using a transformation matrix and MIMO CSI indicating a transmission path characteristic between the transmitter 100 and the receiver 200.

For example, the transmitter 100 is provided in any one of a radio base station and a radio terminal and the receiver 200 is provided in the other. In the present embodiment, it is assumed that the receiver 200 is provided in a radio terminal. In the following description, supposed is a case where a propagation path 4 varies due to a movement of the receiver 200 or a movement of a scatterer present between the transmitter 100 and the receiver 200.

In the present embodiment, multiple antennas are provided in each of the transmitter 100 and the receiver 200. Specifically, the transmitter 100 includes a transmission processor 2 and multiple transmission antennas #1 to #T (T≧2). The transmission antennas #1 to #T form an antenna array. The transmission processor 2 performs control of transmission data, e.g., adaptive modulation control, or transmission beam forming by pre-coding based on a MIMO CSI prediction value to be obtained from the channel information prediction system 10.

The receiver 200 receives a radio signal which is transmitted by the transmitter 100 through the propagation path 4. The receiver 200 includes a reception processor 6 and multiple reception antennas #1 to #R (R≧2). The reception antennas #1 to #R form an antenna array. The reception processor 6 demodulates radio signals (reception signals) which are received by the reception antennas #1 to #R and outputs reception data.

The channel information prediction system 10 includes a channel estimation unit 8 and a channel prediction unit 9. The channel estimation unit 8 estimates a current MIMO CSI based on a reception signal. The MIMO CSI is expressed as a matrix consisting of multiple antenna-to-antenna elements which are distinguished by a transmission path characteristic between one transmission antenna in the transmitter 100 and one reception antenna in the receiver 200.

The channel prediction unit 9 calculates a MIMO CSI prediction value by the beamspace liner prediction processing based on the current MIMO CSI and the past MIMO CSI which are estimated by the channel estimation unit 8. In other words, MIMO CSI at the time of the next transmission in the transmitter 100 is predicted.

The channel prediction unit 9 obtains a prediction value of the MIMO CSI (a MIMO CSI prediction value) in such a manner that estimation is performed on the transformation MIMO CSI to be obtained by transforming the MIMO CSI using the transformation matrix and the resultant prediction value for the transformation MIMO CSI is inversely transformed. Specifically, a linear prediction based on autoregressive (AR) model (AR-LP) is carried out for each element of the transformation MIMO CSI obtained by multiplying the MINO CSI by the transformation matrix.

(2) Channel Model

Also referring FIG. 1, a channel model to be applied to the present embodiment is described.

In the radio communication, an electric wave (a radio signal) radiated from the transmitter 100 is reflected by various scatterers before reaching the receiver 200 through the multiple propagation paths (multi-path). Each reflected wave is called as a ray and the multi-path propagation path 4 is expressed by the superposition of rays.

In an OFDM system which has become the mainstream in recent years, each sub-carrier is a sufficiently-narrow-band. Therefore, supposed in the present embodiment is a flat fading environment where a delay time difference of each path can be ignored. If the receiver 200 or the scatterer is moving, the each ray is subjected to the Doppler shift. The number of the Doppler frequencies of the ray 1 is given by the following equation:

[Formula 1]

$$f_d = \frac{v\cos\theta_l}{\lambda} \quad (1)$$

where v is a moving speed of the receiver 200, λ, is a wavelength, $\theta_1$ is an angle between a moving direction of the receiver 200 and an arrival angle of the ray. Accordingly, the multi-path propagation path 4 at time t can be expressed by the following equation using L rays:

[Formula 2]

$$h(t) = \sum_{l=1}^{L} \alpha_l e^{j2\pi f_l t} = \sum_{l=1}^{L} \alpha_l e^{j\omega_l t} \quad (2)$$

where $\alpha_l$ is a complex scatter factor of the ray l. After that, when a spatial dimension is added to each ray, the equation can be expanded to the following MIMO multi-path propagation path expression:

[Formula 3]

$$H(t) = \sum_{l=1}^{L} \alpha_l a_{r,l} a_{t,l} e^{j\omega_l t} \quad (3)$$

where $\alpha_{r,l}$ and $\alpha_{t,l}$ are respectively reception/transmission array response vectors for the ray l and the sizes thereof are a reception antenna number R and a transmission antenna number T. When an interval, which is d, between antenna elements is assumed to be an equal interval linear array antenna, the transmission array response vector for the ray l can be expressed by the following equations:

[Formula 4]

$$a_{t,l}^T = [\, 1 \quad e^{-j\Omega_{t,l}} \quad e^{-j2\Omega_{t,l}} \quad \ldots \quad e^{-j(T-1)\Omega_{t,l}} \,] \quad (4)$$

$$\Omega_{t,l} = \frac{2\pi}{\lambda} d\sin\phi_{t,l} \quad (5)$$

where $\Phi_{t,l}$ is a direction of departure (hereinafter abbreviated as DoD) of the ray l. The equation (3) can be expressed by the following equations using a matrix representation.

[Formula 5]

$$H(t) = \sum_{l=1}^{L} \alpha_l a_{r,l} a_{t,l} e^{j\omega_l t} = A_r P(t) A_t^T = A_r X W(t) A_t^T \quad (6)$$

$$P(t) = \mathrm{diag}(\alpha_1 e^{j\omega_1 t}, \alpha_2 e^{j\omega_2 t}, \ldots, \alpha_L e^{j\omega_L t}) \quad (7)$$

$$X = \mathrm{diag}(\alpha_1, \alpha_2, \ldots, \alpha_L) \quad (8)$$

$$W(t) = \mathrm{diag}(e^{j\omega_1 t}, e^{j\omega_2 t}, \ldots, e^{j\omega_L t}) \quad (9)$$

The sizes of $A_r$ and $A_t$ are respectively R×L and T×L which are a set of reception and transmission array responses for the L rays. The estimated MIMO CSI contains errors due to noise effects. Thus, the equation can be expressed as follows.

[Formula 6]

$$\tilde{H}(t) = H(t) + Z(t) \quad (10)$$

(3) Outline of Beamspace Linear Prediction Processing

Now, the AR-LP and beamspace transformation to be commonly used in the present embodiment is described.

(3.1) Linear Prediction Based on AR Model (AR-LP)

Figure 2:
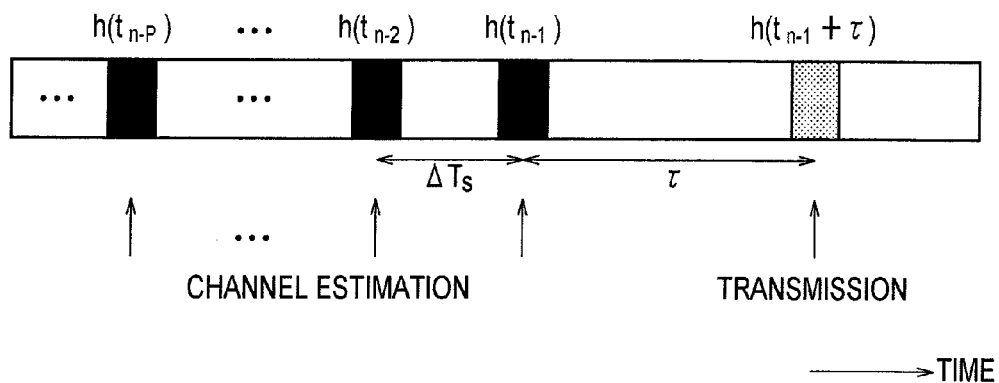
FIG. 2 is a view showing a relationship between an estimated time and transmission time of MIMO CSI according to the embodiment of the present invention.

In many channel predictions, a common approach is such that a channel factor is assumed to follow an AR model. The AR-LP is implemented by utilizing a side lobe in an autocorrelation characteristic of a channel. FIG. 2 shows a relationship between an estimated time and a transmission time of MIMO CSI.

The AR-LP of 1 tap prediction ($\tau = \Delta T_s$) is expressed by the following equation based on the past P MIMO CSIs and $\hat{h}(t_{n-1}) \sim \hat{h}(t_{n-P})$ estimated at an interval $\Delta T_s$:

[Formula 7]

$$\hat{h}(t_{n-1} + \tau) = \hat{h}(t_n) = \sum_{j=1}^{P} d(j)\tilde{h}(t_{n-j}) \quad (11)$$

where d (j) is a linear prediction filter coefficient. The optimum filter coefficient d=[d(1) ... d(P)] minimizes an error of a mean root square of the prediction value and is given by the following equation:

[Formula 8]

$$d = R^{-1} r \qquad (12)$$

where R is an autocorrelation matrix having a factor of $R_{ij}=E[h(t_{n-i})h^*(t_{n-j})]$ and r is an autocorrelation vector having a factor of $r_j = E[h(t_n)h^*(t_{n-j})]$.

In the present embodiment, the past MIMO CSI is used to calculate an autocorrelation matrix and an autocorrelation vector by a sample mean. In the case of multiple tap predictions ($\tau > \Delta T_s$), the prediction is repeated by using the prediction value for filter input.

(3.2) Beamspace Transformation

If an infinite number of rays form a Rayleigh fading, an autocorrelation characteristic thereof is expressed by the Bessel function of the first kind zero order. In contrast, the effects of the finite number of rays consuming large power become dominant on the channel variation under real environment, especially an outdoor environment where movement of a terminal is expected.

In such a case, the side lobe of the autocorrelation characteristic has a much larger value. This is more obvious as the number of the dominant rays is smaller. If the number of the dominant rays is set to L, all the components of the MIMO channel are affected by the L rays.

For this reason, if the number of rays present in each component is reduced by transforming the MIMO CSI estimated as the following equation, the prediction performance should be improved:

[Formula 9]

$$\tilde{Y}(t) = W_r^H \tilde{H}(t) W_t \qquad (13)$$

where $W_r$ and $W_t$ are respectively the receiver-side and transmitter-side transformation matrixes of R×R and T×T. The AR-LP is performed in each component of the transformation MIMO CSI and the inverse transformation is performed as the following equation, so that a prediction value of the MIMO CSI (a MIMO CSI prediction value) is obtained:

[Formula 10]

$$\hat{H}(t+\tau) = (W_r^H)^{-1} \hat{Y}(t+\tau) W_t^{-1} \qquad (14)$$

where Ŷ(t+τ) is a prediction value in the transformation MIMO CSI.

(4) Configuration of Channel Prediction Unit

Figure 3:
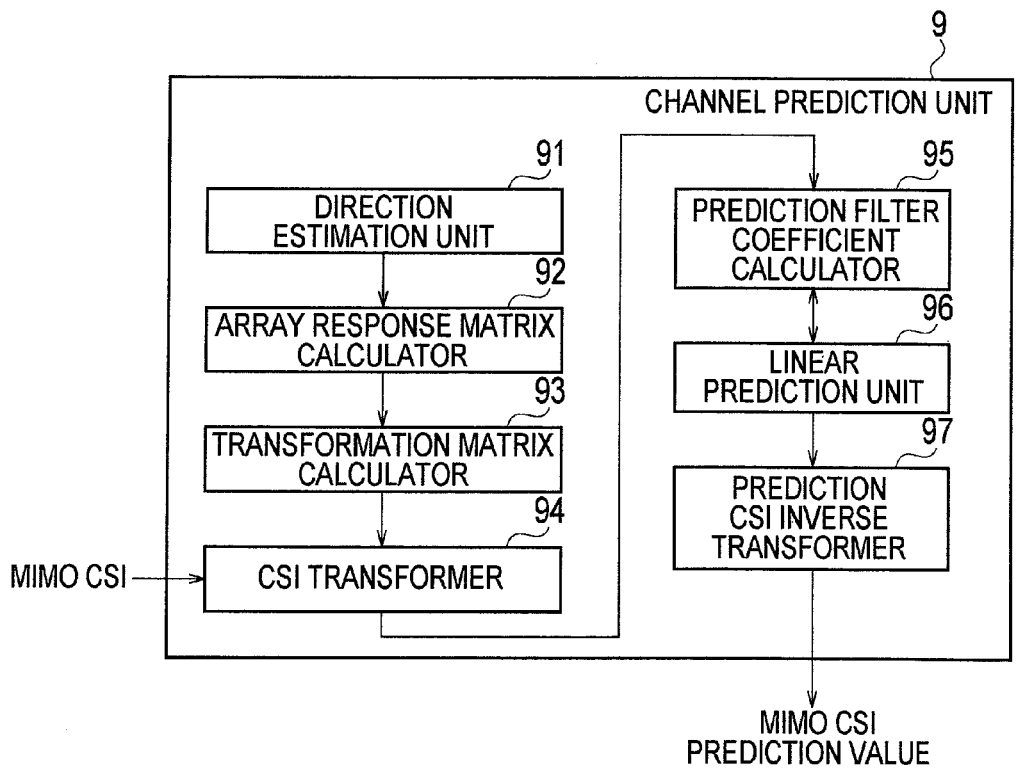
FIG. 3 is a functional block diagram showing the configuration of a channel prediction unit according to the embodiment of the present invention.

FIG. 3 is a functional block configuration diagram showing the configuration of the channel prediction unit 9.

As shown in FIG. 3, the channel prediction unit 9 includes a direction estimation unit 91, an array response matrix calculator 92, a transformation matrix calculator 93, a CSI transformer 94, a prediction filter coefficient calculator 95, a linear prediction unit 96, and a prediction CSI inverse transformer 97.

The direction estimation unit 91 estimates a direction of arrival (DoA) and a direction of departure (DoD) of a radio signal (a ray) using the direction estimation technique. The array response matrix calculator 92 calculates an array response matrix from the direction of arrival (DoA) and the direction of departure (DoD) which are estimated by the direction estimation unit 91. For example, if the ESPRIT algorithm is used as the direction estimation technique, an arrival direction of the ray is obtained and the array response of the antenna array is obtained from the arrival direction. Such an array response is associated with the arrival direction of the ray. Alternatively, if the minimum-norm solution is used as a direction estimation technique, not the array response but the array weight associated with the arrival direction is obtained.

The transformation matrix calculator 93 calculates a transformation matrix based on the array response or array weight of the antenna array. It is preferable that the transformation matrix have a well-conditioned, i.e., a small product of the norm of the matrix and the norm of the inverse matrix. In the present embodiment, a unitary matrix is used as such a transformation matrix.

If an array response matrix is calculated from the arrival direction estimated by the direction estimation unit 91, the transformation matrix calculator 93 performs the QR decomposition of the calculated array response matrix and the unitary matrix obtained by the QR decomposition is used as a transformation matrix.

The CSI transformer 94 multiplies the MIMO CSI estimated by the channel estimation unit 8 and the transformation matrix calculated by the transformation matrix calculator 93 to obtain transformation MIMO CSI. In the transformation MIMO CSI, the number of rays in the components is reduced in comparison with the MIMO CSI.

For example, as shown in FIG. 4(a), if each of the transmitter 100 and the receiver 200 includes two antennas and three rays #1 to #3 are present, the MIMO CSI estimated by the channel estimation unit 8 is a matrix as shown in FIG. 4(b). In the MIMO CSI shown in FIG. 4(b), individual components ($h_{11}, h_{12}, h_{21}, h_{22}$) of the MIMO CSI includes the effects of the rays #1 to #3.

With respect to the MIMO CSI shown in FIG. 4(b), the transformation matrixes $W_r^H$ and $W_t$ to be calculated by the transformation matrix calculator 93 are multiplied, so that the transformation MIMO CSI as shown in FIG. 4(c) is obtained. In the transformation MIMO CSI shown in FIG. 4(c), the component $y_{22}$ is affected by the ray #1, the component $y_{21}$ is affected by the rays #1 and #2, the component $y_{12}$ is affected by the rays #1 and #3, and the component $y_{11}$ is affected by the rays #1 to #3.

The prediction filter coefficient calculator 95 calculates a prediction filter coefficient using a low ray element whose number of rays is the smallest among the components of the transformation MIMO CSI. As for the low ray element, the prediction with high precision is possible for the number of rays is small. In the example of FIG. 4(c), the component $y_{22}$ is the low ray component whose number of rays is the smallest. The linear prediction unit 96 performs channel prediction using the prediction filter coefficient with respect to the low ray element.

After that, as shown in FIG. 4(d), the prediction filter coefficient calculator 95 and the linear prediction unit 96 perform the channel prediction using the prediction filter coefficient for the component $y_{22}$ with respect to the component $y_{12}$ whose number of rays is the second smallest. The channel prediction is also performed not only for the time of the prediction target but for the estimation time. Then, the prediction value for the estimation time obtained from the channel prediction is subtracted from the component $y_{12}$, so that the component of the ray #1 is suppressed in the component $y_{12}$.

Furthermore, as for the component $y_{12}$ whose component of the ray #1 is suppressed, a prediction filter coefficient is calculated and a prediction value is calculated. This prediction value is added to the prediction value obtained by the channel prediction using the prediction filter coefficient for the component $y_{12}$. This type of processing (hereinafter referred to as a serial canceller (SC) as needed) is also repeatedly applied to the components $y_{21}$ and $y_{11}$. As a result, prediction values for the components ($y_{11}$, $y_{12}$, $y_{21}$, $y_{22}$) of the transformation MIMO CSI are obtained.

The prediction CSI inverse transformer 97 calculates a MIMO CSI prediction value by inversely transforming the prediction value of the transformation MIMO CSI obtained as such.

(5) Details of Beamspace Linear Prediction Processing

The transformation matrix and the linear prediction approach according to the present embodiment are described now. In the present embodiment, it is assumed that each of DoA/DoD estimations of R−1 rays and T−1 rays is possible by using the direction estimation technique with respect to the estimated MIMO CSI.

(5.1) Transformation Matrix of Beamspace Based on DoA/DoD (DBS)

Supposed now is a transformation matrix that can reduce the number of rays present in each component of transformation MIMO CSI based on estimated DoA/DoD of ray and has a well-conditioned.

It is firstly assumed that DoAs of R−1 rays can be estimated in the order from one with the biggest amplitude. In other words,

[Formula 11]

$$|\alpha_1| \geq |\alpha_2| \geq \Lambda \geq |\alpha_{R-1}| \geq \Lambda \geq |\alpha_L| \qquad (15)$$

it is assumed in the above equation that information of $\phi_{r,1}$~$\phi_{r,R-1}$ is obtained. From this DoA, the reception array response cofactor of R×(R−1) can be obtained as the following equation.

[Formula 12]

$$A_{r,R} = [a_{r,1} a_{r,2} \Lambda a_{r,R-1}] \qquad (16)$$

When this inverse matrix is used as a transformation matrix, the reception array response cofactor is diagonalized and the number of rays present in each component of the transformation MIMO CSI is reduced. However, this inverse matrix generally becomes one with a poor-conditioned. For this reason, QR decomposition is performed on equation (16) so as to decompose the equation (16) into the products of the unitary matrix of R×R to be expressed by the following equation and the upper triangular matrix of R×(R−1).

[Formula 13]

$$A_{r,R} = Q_r R_r \qquad (17)$$

The condition number of the unitary matrix is the best and does not amplify noise. Accordingly, when $Q_r$ is used as a receiver-side transformation matrix, the receiver-side array response cofactor can be transformed to the upper triangular matrix $R_r$. After that, the MIMO CSI is transformed by the R-th column of $Q_r$, so that transformation MISO CSI is obtained. The rays 1 to R−1 are suppressed by null. Therefore, it is assumed that T−1 DoDs can be estimated from another ray. In other words, in the ray amplitude after transformation,

[Formula 14]

$$|\alpha_R'| \geq |\alpha_{R+1}'| \geq \Lambda \geq |\alpha_{R+T-2}'| \geq \Lambda \geq |\alpha_L'| \qquad (18)$$

it is assumed in the above equation that information of $\phi_{r,R}$ to $\phi_{r,R+T-2}$ are obtained. As for the transmitter side, when the processing similar to that of the receiver side is performed, the equation is decomposed into the product of the lower triangular matrix of (T−1)×T to be expressed by the following equation and the unitary matrix of T×T.

[Formula 15]

$$A_{t,T}^T = (Q_t R_t)^T = L_t Q_t^T \qquad (19)$$

When $Q_t^*$ is used as the transmitter-side transformation matrix, the MIMO CSI is transformed as the following equations.

[Formula 16]

$$\tilde{Y}(t) = Q_r^H \tilde{H}(t) Q_t^* \qquad (20)$$

$$= [R_r \ A_{r,T}' \ A_{r,O}'] P(t) \begin{bmatrix} A_{t,R}'^T \\ L_t \\ A_{t,O}'^T \end{bmatrix} + Z'(t)$$

$$= R_r P_R(t) A_{t,R}'^T + A_{r,T}' P_T(t) L_t +$$

$$A_{r,O}' P_O(t) A_{t,O}'^T + Z'(t)$$

$$P_R(t) = \text{diag}(\alpha_1 e^{j\omega_1 t}, \alpha_2 e^{j\omega_2 t}, \Lambda, \alpha_{R-1} e^{j\omega_{R-1} t}) \qquad (21)$$

$$P_T(t) = \text{diag}(\alpha_R e^{j\omega_R t}, \alpha_{R+1} e^{j\omega_{R+1} t}, \Lambda, \alpha_{R+T-2} e^{j\omega_{R+T-2} t}) \qquad (22)$$

$$P_O(t) = \text{diag}(\alpha_{R+T-1} e^{j\omega_{R+T-1} t}, \alpha_{R+T} e^{j\omega_{R+T} t}, \Lambda, \alpha_L e^{j\omega_L t}) \qquad (23)$$

With these equations, it can be seen that the transformation is made so that the number of rays present in the components becomes smaller on the lower-right.

Forming a beamspace directing null to the estimated DoA and DoD as described above, the number of rays present in each component of the transformation MIMO CSI is reduced and the complication of the channel variation is reduced, so that the prediction performance is improved. In the final analysis, the prediction value of the transformation MIMO CSI is inversely transformed, so that a prediction value of MIMO CSI (MIMO CSI prediction value) is obtained.

Note that, in the description of the transformation matrix of the beamspace based on the DoA/DoD (DBS), the description is given of the case where it is assumed that DoAs of T−1 rays can be estimated in the order from the one with the biggest amplitude. However, in addition to this, before the estimation, in a case where it is assumed that DoDs of R−1 rays can be estimated in the order from one with the biggest amplitude, when the MIMO CSI transformation is performed, a transformation SIMO CSI is obtained as a result.

(5.2) Linear Prediction in which Serial Canceller (SC) is Introduced

On the other hand, the array response cofactor is not diagonalized and only triangulated. Accordingly, the number of rays present in the upper-left component of the transformation MIMO CSI is not reduced so much. As a result, the prediction performance is not sufficiently improved.

Looking now at the third term of equation (20), the ray R+T−1 to L are contained in all the components. In contrast, the (R, T) component only contains those rays. For this reason, the linear prediction filter coefficient calculated for the (R, T) component is used, so that those ray components contained in another component are removed. This is described below in detail. For the sake of simple description, noise components are omitted. First, the linear prediction filter coefficient calculated for the (R, T) component is set to be $d_{R,T}$. Next, the linear prediction of the (R−1, T) is performed by using this filter coefficient, so that the following equation is obtained:

[Formula 17]

$$\hat{y}_{R-1,T}^{(R,T)}(t_n) = \sum_{j=1}^{P} d_{R,T}(j) y_{R-1,T}(t_{n-j}) \qquad (24)$$

$$= [R_r \hat{P}_R^{(R,T)}(t_n) A'^T_{t,R}]_{R-1,T} +$$

$$[A'_{r,O} \hat{P}_O^{(R,T)}(t_n) A'^T_{t,O}]_{R-1,T}$$

where $[\cdot]_{x,y}$ means the (x, y) component of a matrix. For the sake of simple description, when it is assumed that the linear prediction is perfect for a target ray, the second term is a replica of the ray R+T−1 to L contained in the (R−1, T). Therefore, the linear prediction corresponding to the CSI estimation time is also performed and when the prediction value is subtracted from the estimated value,

[Formula 18]

$$y_{R-1,T}^{(R,T)}(t_m) = y_{R-1,T}(t_m) - \hat{y}_{R-1,T}^{(R,T)}(t_m) \qquad (25)$$

$$= [R_r P_R(t_m) A'^T_{t,R}]_{R-1,T} -$$

$$[R_r \hat{P}_R^{(R,T)}(t_m) A'^T_{t,R}]_{R-1,T} \quad (t_m < t_n)$$

the above equation is obtained. This signal is affected only by the ray R−1, so that high performance AR-LP can be expected. The AR-LP is performed for CSI in the equation (25), when it is assumed that the next prediction value of $$\hat{y}_{R-1,T}^{(R-1,T)}(n) \qquad \text{[Formula 19]}$$

is obtained, the final prediction value of the (R−1, T) component is as follows.

[Formula 20]

$$\hat{y}_{R-1,T}(t_n) = \hat{y}_{R-1,T}^{(R,T)}(t_n) + \hat{y}_{R-1,T}^{(R-1,T)}(t_n) \qquad (26)$$

When the above prediction processing is generalized as the linear prediction of the (Ra, Ta) component, the following equation is obtained:

[Formula 21]

$$\hat{y}_{Ra,Ta}(t_n) = \hat{y}_{Ra,Ta}^{(R,T)}(t_n) + \hat{y}_{Ra,Ta}^{(R-1,T)}(t_n) + \Lambda +$$
$$\hat{y}_{Ra,Ta}^{(Ra,T)}(t_n) + \hat{y}_{Ra,Ta}^{(R,T-1)}(t_n) + \hat{y}_{Ra,Ta}^{(R,T-2)}(t_n) +$$
$$\Lambda + \hat{y}_{Ra,Ta}^{(R,Ta)}(t_n) \; (+\hat{y}_{Ra,Ta}^{(Ra,Ta)}(t_n) \; \text{if} \; Ra \neq R \; \text{or}$$
$$Ta \neq T) \qquad (27)$$

where

[Formula 22]

$$\hat{y}_{Ra,Ta}^{(R,T-1)}(t_n) = \sum_{j=1}^{P} d_{R,T-1}(j) y_{Ra,Ta}^{(Ra,T)}(t_{n-j}) \qquad (28)$$

As for ( ), it is used for ensuring the operation in the case where the null by the transmitter-side transformation matrix is directed to the ray whose DoA is estimated on the receiver side. Ideally, the AR-LP is only performed on the L-R-T+2 rays in maximum, so that the prediction performance can be expected to be improved.

(6) Operation of Multi-Antenna Transmission System

The operation of the multi-antenna transmission system 1 is described below.

(6.1) Overall Operation

Figure 5:
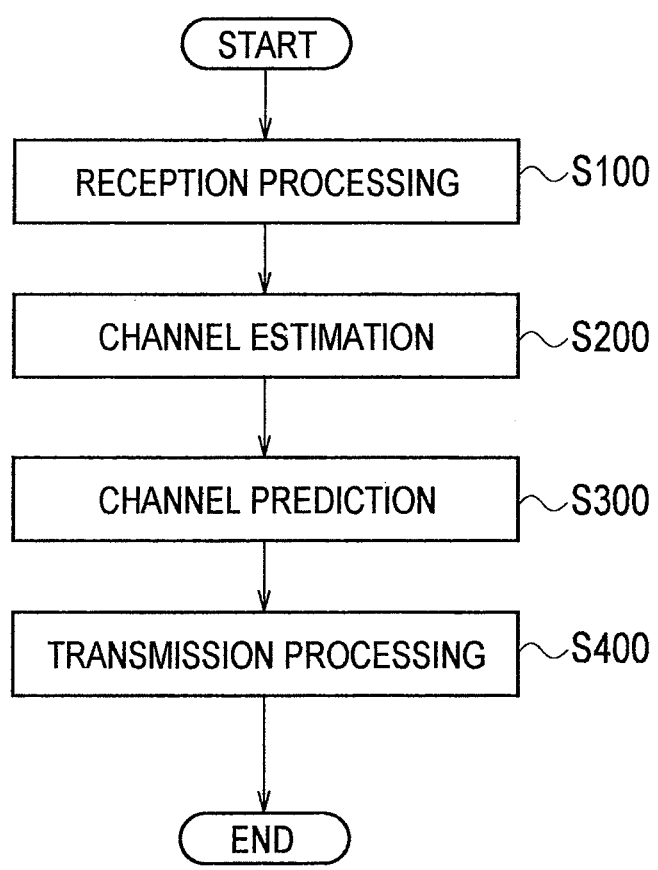
FIG. 5 is a flowchart showing an overall operation of the multi-antenna transmission system according to the embodiment of the present invention.

FIG. 5 is a flowchart showing an overall operation of the multi-antenna transmission system 1.

At step S100, the reception processor 6 of the receiver 200 demodulates radio signals (reception signals) which are received by the reception antennas #1 to #R and outputs reception data.

At step S200, the channel estimation unit 8 estimates MIMO CSI.

At step S300, the channel prediction unit 9 calculates a MIMO CSI prediction value by the beamspace linear prediction processing.

At step S400, the transmitter 100 performs control of transmission data, e.g., adaptive modulation control, or transmission beam forming by pre-coding based on the MIMO CSI prediction value calculated by the channel prediction unit 9.

(6.2) Operation of Channel Prediction Unit

Figure 6:
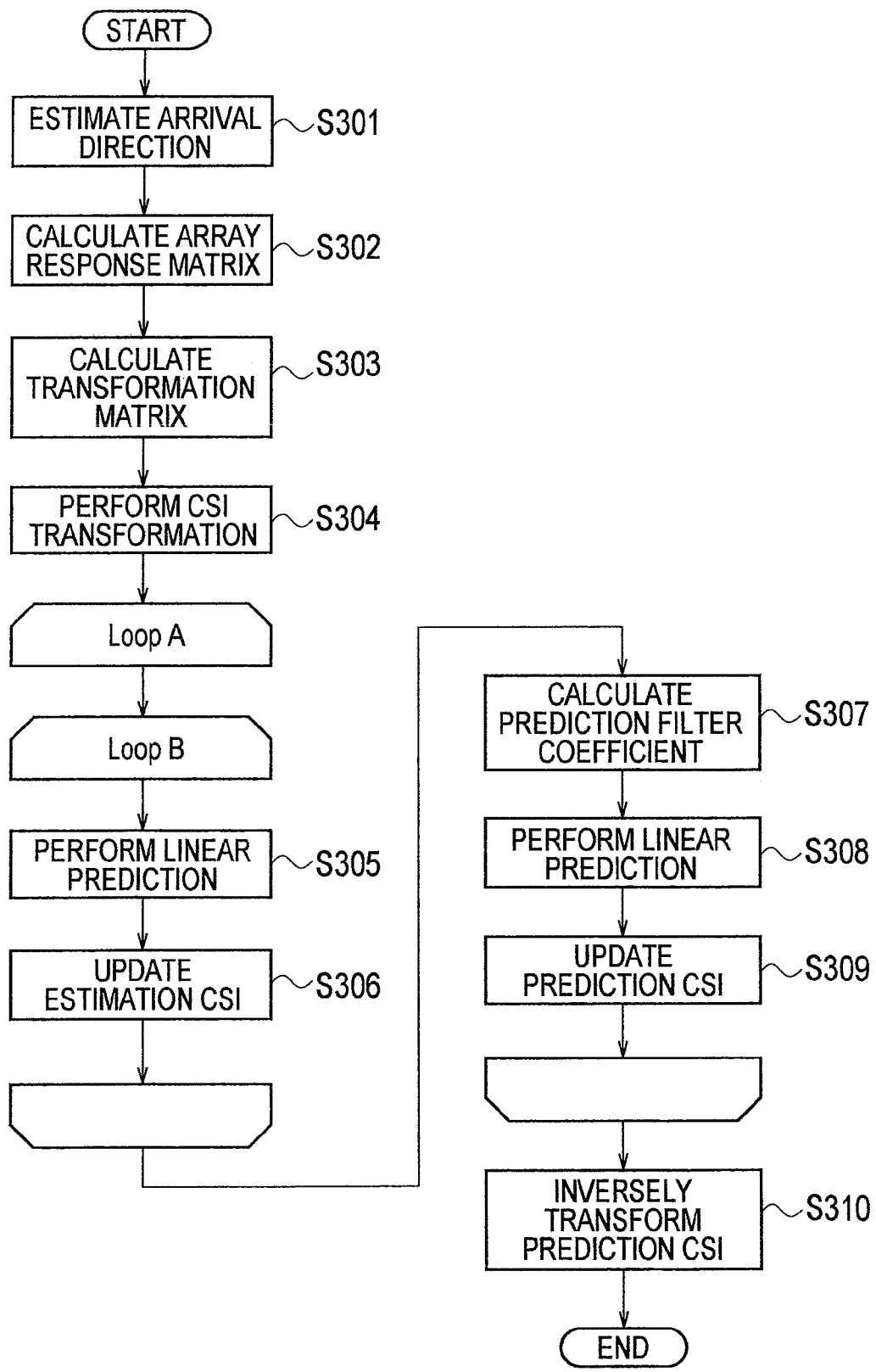
FIG. 6 is a flowchart showing the operation of the channel prediction unit according to the embodiment of the present invention.

FIG. 6 is a flowchart showing the operation of the channel prediction unit 9.

At step S301, the direction estimation unit 91 estimates an arrival direction (DoA) and a departure direction (DoD) of a ray using the direction estimation technique.

At step S302, the array response matrix calculator 92 calculates an array response matrix from the DoA/DoD estimated by the direction estimation unit 91.

At step S303, the transformation matrix calculator 93 calculates a transformation matrix from the array response matrix calculated by the array response matrix calculator 92.

At step S304, the CSI transformer 94 multiplies the MIMO CSI estimated by the channel estimation unit 8 and the transformation matrix calculated by the matrix calculator 93 to obtain transformation MIMO CSI.

Thereafter, each of Loop A and Loop B is started. The Loop A is a loop which is repeated until processing on each component of the transformation MIMO CSI is finished. For example, in a case of 4 transmission antennas and 2 reception antennas, the processing continues 4×2=8 times.

The Loop B is a loop utilizing a calculated prediction filter coefficient. For example, in FIG. 4(d), the loop is omitted for the component $y_{22}$, the loop is performed once for the components $y_{12}$ and $y_{21}$, and the loop is performed twice for the component $y_{11}$. The prediction processing is started from a low ray element (component) among the transformation MIMO CSI. Therefore, steps S307 to S309 are described first.

At step S307, the prediction filter coefficient calculator 95 calculates a prediction filter coefficient on a component of a prediction target among the transformation MIMO CSI.

At step S308, the linear prediction unit 96 performs linear prediction on the component of the prediction target among the transformation MIMO CSI by using the prediction filter coefficient calculated by the prediction filter coefficient calculator 95.

At step S309, the linear prediction unit 96 calculates a prediction value on the component of the prediction target among the transformation MIMO CSI by the linear prediction.

(First Prediction)

At step S305, the linear prediction unit 96 performs linear prediction using the prediction filter coefficient calculated at step S307 on the component to be the next prediction target among the transformation MIMO CSI. Note that this linear prediction is performed not only on a prediction time (a future time to be a prediction target) but also on an estimation time (a time in which MIMO CSI is estimated).

At step S306, the linear prediction unit 96 suppresses the number of rays in the component to be the next prediction target, by subtracting the prediction value obtained using the calculated prediction filter coefficient (the prediction value of the MIMO CSI for the estimation time) from the component to be the next prediction target.
(Second Prediction)
At step S307 again, the prediction filter coefficient calculator 95 calculates a prediction filter coefficient on the component to be the next prediction target with the number of rays being suppressed.

At step S308, the linear prediction unit 96 calculates a prediction value, by performing the linear prediction using the prediction filter coefficient with respect to the component to be the next prediction target with the number of rays being suppressed.
(Final Prediction)
At step S309, the liner prediction unit 96 adds, with respect to the component to be the next prediction target, the prediction value (the prediction value obtained by the first prediction) obtained using the calculated prediction filter coefficient and the prediction value obtained after the rays are suppressed (the prediction value obtained by the second prediction), so that a final prediction value with respect to the component to be the next prediction target is obtained.

As described above, the prediction value with respect to each component of the MIMO CSI is calculated.

At step S310, the prediction CSI inverse transformer 97 calculates a MIMO CSI prediction value by inversely transforming the prediction value with respect to each component of the transformation MIMO CSI.

(7) Effects

The effects that are obtained by the present embodiment are described using comparative examples. Specifically, following channel prediction methods (a) to (d) are described by comparing each other.
(a) Method which is a linear prediction based on AR-LP: AR model but does not use the beamspace transformation matrix (conventional art 1).
(b) Method which is a linear prediction based on BS-AR: AR model and uses a simple beamspace transformation matrix (conventional art 2).
(c) Method which is a linear prediction based on DBS-AR: AR model and uses a beamspace transformation matrix based on DoA/DoD (DBS) (the present embodiment).
(d) Method which is a linear prediction based on DBS-ARw/SC: AR model and uses a beamspace transformation matrix based on DoA/DoD (DBS) and implements a serial canceller (the present embodiment).

The above-described methods are evaluated by computer simulation. A channel prediction error for a delay time T is evaluated by the root mean square error (RMSE) which is defined by the following equations:

[Formula 23]

$$\mathrm{RMSE}(\tau) = \sqrt{E_f[\|e(t+\tau)\|_F^2]/E_f[\|H(t+\tau)\|_F^2]} \quad (29)$$

$$e(t+\tau)\hat{H}(t+\tau) - H(t+\tau) \quad (30)$$

where $\|\cdot\|_F$ shows Frobenius norm. Also, the signal-to-noise ratio (SNR) of the estimation CSI is defined as the following equation.

[Formula 24]

$$\mathrm{SNR} = E_f[\|H(t)\|_F^2]/E_f[\|Z(t)\|_F^2] \quad (31)$$

The evaluation is performed for 1000 snaps. In each snap, DoA/DoD of each ray and a moving direction of the receiver 200 are set at random according to the complex Gaussian distribution with the complex scatter factor of 0 on an average and the distribution of 1 according to the 360 degree uniform distribution. The set parameters are assumed to be constant within the snap. Assumed is that the number of rays is 10, the maximum frequency of the Doppler is 100 Hz, and the estimated rate of CSI is 500 Hz. A prediction filter coefficient is calculated by the estimated CSI obtained from 1000 samples and a prediction error is evaluated in the CSI of the following 100 samples. The SNR of the estimated CSI is set to 30 dB.

Figure 7:
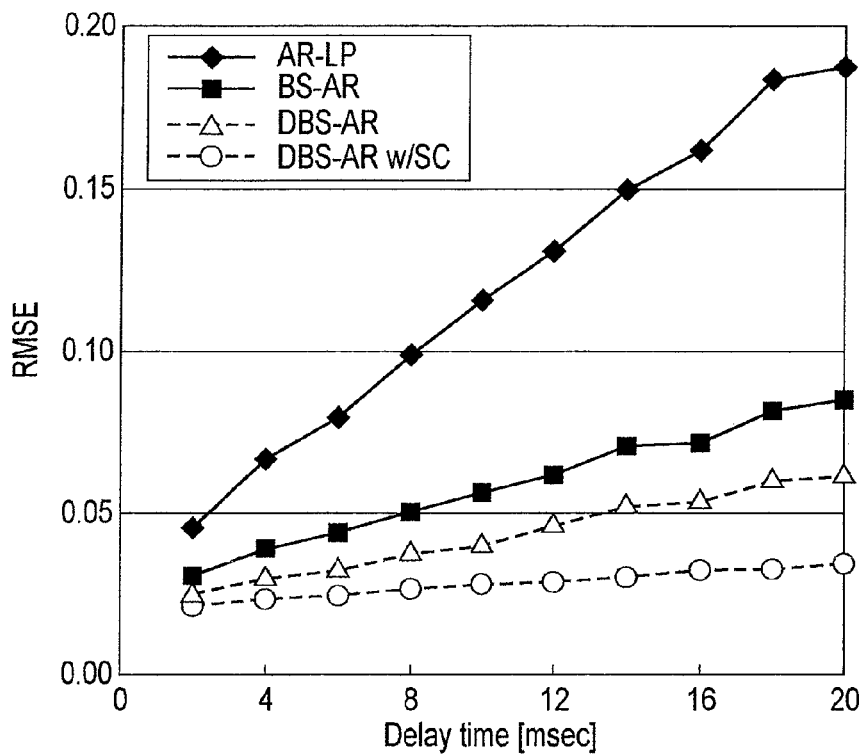
FIG. 7 is a view showing a prediction characteristic when the number of antennas is 4×4 and the order of the prediction filter is 20.

FIG. 7 shows a prediction characteristic when the number of antennas is 4×4 and the order of the prediction filter is 20.

In contrast with the conventional AR-LP, in the simple SB-AR, the prediction performance is improved by the decrease in the number of rays. When the transformation matrix according to the present embodiment is used, the prediction performance is improved by actively reducing the number of rays. However, the number of rays is not sufficiently reduced in the component in the upper-left. Thus, the degree of deterioration for the delay time is not improved so much. In contrast, when a serial canceller is introduced, the prediction performance characteristic for the increase of the delay time is greatly improved.

Figure 8:
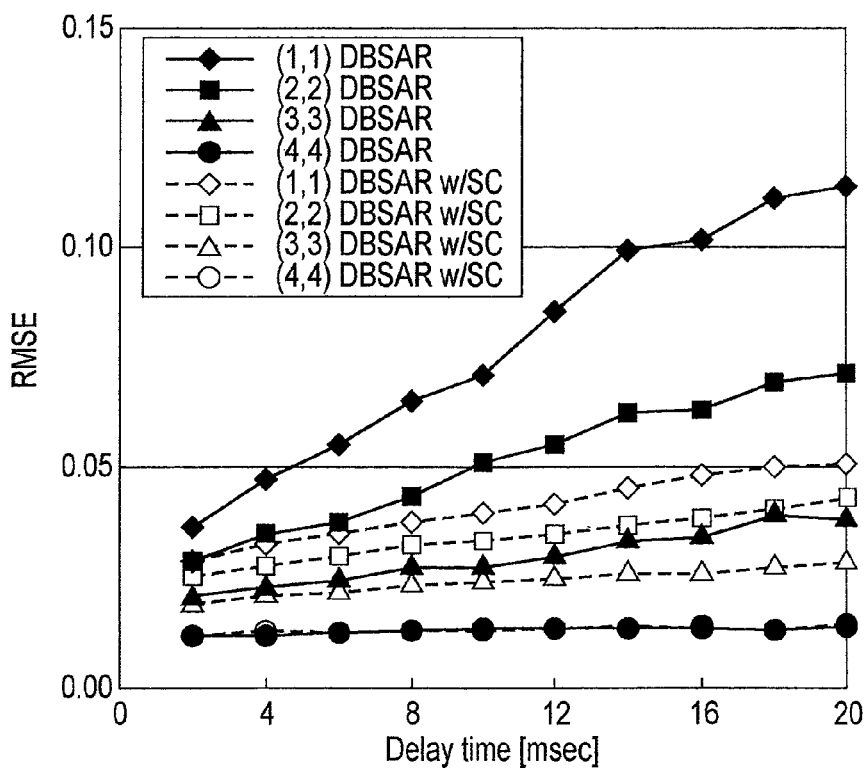
FIG. 8 is a view showing a RMSE characteristic in each component of the transformation MIMO CSI.

FIG. 8 shows a RMSE characteristic in each component of the transformation MIMO CSI.

The prediction performance is not improved in the component in the upper-left only by using the transformation matrix according to the present embodiment. However, with the instruction of the serial canceller, the prediction performance is greatly improved in any component.

Figure 9:
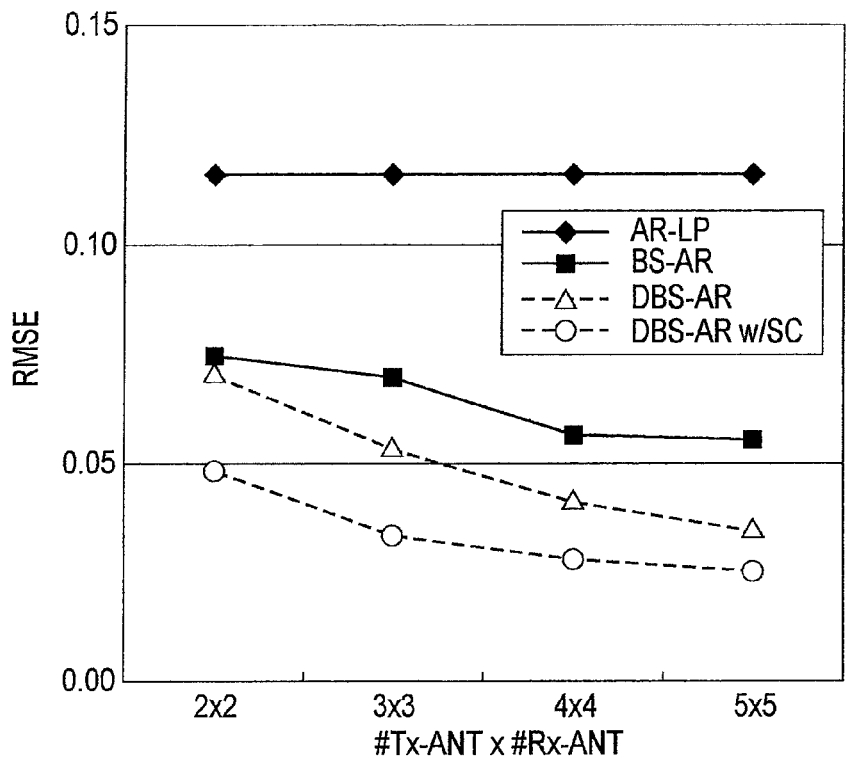
FIG. 9 is a view showing the characteristic when the number of antennas is 2×2 to 5×5.

FIG. 9 shows the characteristic when the number of antennas is 2×2 to 5×5.

When only the beamspace transformation is performed, the high prediction performance cannot be obtained unless the number of antennas is increased for some extent. In contrast, when the serial canceller is introduced, a high improvement effect is obtained even with the small number of antennas.

Figure 10:
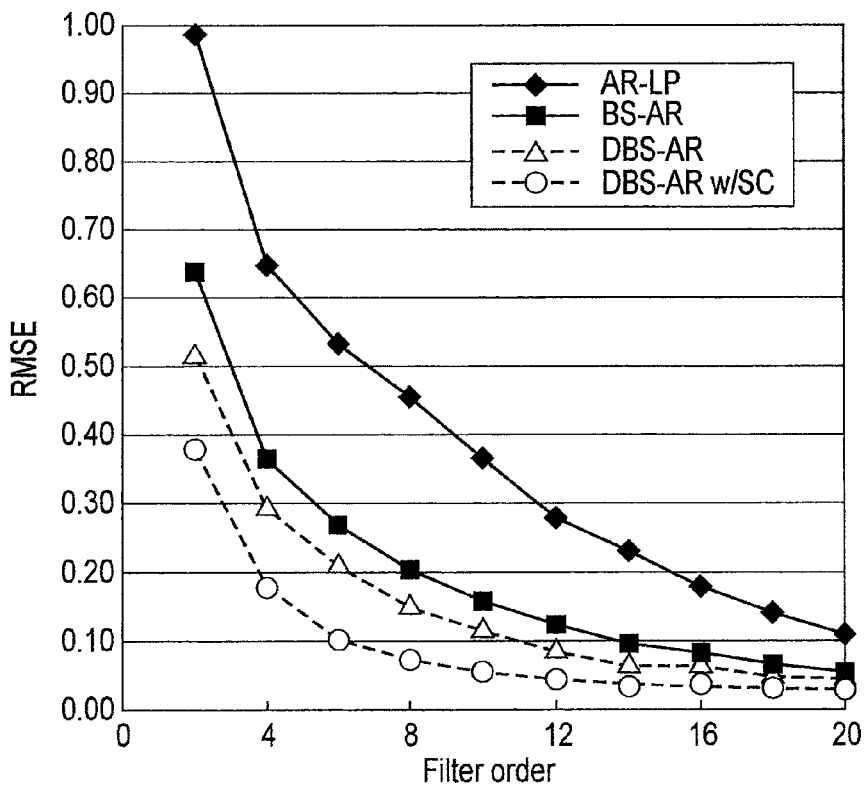
FIG. 10 is a view showing the RMSE characteristic for the order of the filter coefficient when it is assumed that the number of antennas is 4×4 and the delay time is 10 msec.

FIG. 10 shows the RMSE characteristic for the order of the filter coefficient when it is assumed that the number of antennas is 4×4 and the delay time is 10 msec.

In the case of the simple beamspace transformation, when many rays are included in a certain beamspace, the prediction performance is not sufficiently improved. In contrast, with the present embodiment, each AR-LP is performed on the smaller number of rays by effectively reducing the number of rays, so that the high prediction performance can be obtained even in the smaller order.

(8) Other Embodiments

As described above, the contents of the present invention have been disclosed through the above-described embodiments. However, it should not be understood that the description and the drawings, which constitute one part of this disclosure, are to limit the present invention. Various alternative embodiments will be obvious for those skilled in the art from this disclosure.

In the foregoing embodiment, the description is given of a method in which the beamspace transformation matrix based on DoA/DoD (DBS) is used and a serial canceller (SC) is introduced. However, it is a matter of course that even when a simple beamspace transformation matrix is used, a serial canceller (SC) can be introduced.

For example, in the above-described embodiment, the description is given of the system configuration in which each of the transmitter 100 and the receiver 200 has multiple antennas. However, the present invention can be applied to an SIMO system in which the transmitter 100 has one antenna and the receiver 200 has multiple antennas, or a MISO system in which the transmitter 100 has multiple antennas and the receiver 200 has one antenna.

In addition, the unitary matrix is used as a transformation matrix in the above-described embodiment, but the transformation matrix may be another matrix other than the unitary matrix as long as a matrix has a well-conditioned. Note that the "well-conditioned" means such cases as follows. Specifically, a condition number for a matrix A is defined as:

[Formula 25]

$$\kappa(A) = \|A\| \cdot \|A^{-1}\| \tag{32}$$

where $\|\cdot\|$ shows a norm of a matrix. For example, in the case of the Euclidean norm, it is a "well-conditioned" if the condition number is 5 or less and it is a "poor-conditioned" if the condition number is greater than 5. In the case of the unitary matrix, the Euclidean norm is 1 in both cases and the condition number is also 1, which means a "well-conditioned".

As thus described, it is a matter of course that the present invention includes various embodiments which are not described herein. Accordingly, the technical scope of the present invention is defined only by particular matters of the invention according to the scope of claims which is appropriate from the above description.

INDUSTRIAL APPLICABILITY

As described above, the channel information prediction system and the channel information prediction method according to the present invention can further improve the prediction performance of the channel information, thereby being useful in radio communications such as mobile communications.

The invention claimed is:

1. A channel information prediction system configured to calculate a prediction filter coefficient to be used for suppressing an interference component contained in a received radio signal in a multi-antenna transmission system where at least anyone of a transmission side and a reception side of a radio signal uses a plurality of antennas, the channel information prediction system comprising:
a filter coefficient calculator configured to calculate the prediction filter coefficient using a low ray element being an antenna-to-antenna element whose number of rays contained in the radio signal is smaller than a predetermined number among a plurality of antenna-to-antenna elements each between any of transmission antennas on the transmission side and any of reception antennas on the reception side, the antenna-to- antenna elements distinguished by channel information indicating a propagation path characteristic; and
a channel information prediction unit configured to perform a first prediction to predict the channel information at a time of future transmission of the radio signal by using the first prediction filter coefficient calculated by the filter coefficient calculator, and to suppress the component of rays contained in the low ray element, wherein
the filter coefficient calculator calculates the second prediction filter coefficient by using the low ray component whose component of rays is suppressed by the channel information prediction unit, and
the channel information prediction unit performs a second prediction to predict the channel information at a time of future transmission of the radio signal by using the second prediction filter coefficient.

2. The channel information prediction system according to claim 1, wherein
the channel information prediction unit uses the second prediction filter coefficient as the first prediction filter coefficient to perform next fist prediction and suppress the component of rays.

3. The channel information prediction system according to claim 1, wherein the filter coefficient calculator uses the antenna-to-antenna element whose number of rays is the smallest as the low ray element.

4. The channel information prediction system according to claim 1, wherein
the channel information prediction unit suppresses the component of rays contained in another antenna-to-antenna element different from the low ray element on the basis of the prediction filter coefficient, and predicts the channel information at a time of future transmission of the radio signal by using the antenna-to-antenna element whose component of rays is suppressed.

5. A channel information prediction method of calculating a prediction filter coefficient to be used to suppress an interference component contained in a received radio signal in a multi-antenna transmission system where at least anyone of a transmission side and a reception side of a radio signal uses a plurality of antennas, the channel information prediction method comprising the steps of:
calculating the prediction filter coefficient using a low ray element being an antenna-to-antenna element whose number of rays contained in the radio signal is smaller than a predetermined number among a plurality of antenna-to-antenna elements each between any of transmission antennas on the transmission side and any of reception antennas on the reception side, the antenna-to-antenna elements distinguished by channel information indicating a propagation path characteristic;
performing a first prediction to predict the channel information at a time of future transmission of the radio signal by using the calculated first prediction filter coefficient, and suppressing the component of rays contained in the low ray element;
calculating the second prediction filter coefficient by using a low ray component in which the component of rays is suppressed; and performing a second prediction to predict the channel information at a time of future transmission of the radio signal by using the second prediction filter coefficient.

6. The channel information prediction system according to claim 2, wherein the filter coefficient calculator uses the antenna-to-antenna element whose number of rays is the smallest as the low ray element.

7. The channel information prediction system according to claim 2, wherein
the channel information prediction unit suppresses the component of rays contained in another antenna-to-antenna element different from the low ray element on the basis of the prediction filter coefficient, and predicts the channel information at a time of future transmission of the radio signal by using the antenna-to-antenna element whose component of rays is suppressed.

* * * * *